US010536275B2

(12) United States Patent
Burba et al.

(10) Patent No.: US 10,536,275 B2
(45) Date of Patent: Jan. 14, 2020

(54) VERIFICATION OF DOWNLOADED SUBSETS OF CONTENT

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 328 days.

(21) Appl. No.: 15/592,070

(22) Filed: May 10, 2017

(65) Prior Publication Data
US 2018/0331823 A1 Nov. 15, 2018

(51) Int. Cl.
*H04L 9/32* (2006.01)
*H04L 9/06* (2006.01)

(52) U.S. Cl.
CPC .......... *H04L 9/3239* (2013.01); *H04L 9/0643* (2013.01)

(58) Field of Classification Search
CPC ........... G06F 21/64–645; H04L 9/0643; H04L 9/3236–3242; H04L 63/12–123
See application file for complete search history.

(56) References Cited

U.S. PATENT DOCUMENTS

| | | | |
|---|---|---|---|
| 8,694,599 B2 | 4/2014 | Sentinelli et al. | |
| 9,294,580 B2 | 3/2016 | Morriso et al. | |
| 2008/0256255 A1 | 10/2008 | Mordovskoi et al. | |
| 2010/0306339 A1 | 12/2010 | Ling et al. | |
| 2010/0318632 A1 | 12/2010 | Yoo et al. | |
| 2011/0016220 A1 | 1/2011 | Desai et al. | |
| 2011/0125849 A1 | 5/2011 | Boyd et al. | |
| 2011/0282945 A1 | 11/2011 | Thyni et al. | |

(Continued)

FOREIGN PATENT DOCUMENTS

| | | |
|---|---|---|
| WO | 2011119132 A2 | 9/2011 |
| WO | 2014068364 A1 | 5/2014 |

OTHER PUBLICATIONS

"International Search Report and Written Opinion Issued in PCT Patent Application No. PCT/US2018/028766", dated Jul. 2, 2018, 12 Pages.

(Continued)

*Primary Examiner* — Kevin Bechtel
(74) *Attorney, Agent, or Firm* — Fountainhead Law Group PC

(57) ABSTRACT

In some embodiments, a verification service receives a description for a combination of a set of ranges within content available for download. The set of ranges are not sequentially located in the content that a client device has downloaded. The verification service determines if a first portion of the combination of the set of ranges has been received in a prior request. When the first portion has been received, the verification service retrieves a first set of verification values that represent subsets of content corresponding to the first portion. When at least a second portion of the combination of the set of ranges has not been received, the verification service generates a second set of verification values using subsets of content corresponding to the second portion. One or more of the first set of verification values and the second set of verification values are sent to the client device.

20 Claims, 12 Drawing Sheets

(56) References Cited

U.S. PATENT DOCUMENTS

2013/0064370 A1* 3/2013 Gouge ............... H04L 63/0428
                                                        380/255
2014/0280689 A1* 9/2014 Rubenstein .......... G06F 16/172
                                                        709/214

OTHER PUBLICATIONS

Chiu, et al., "Minimizing File Download Time in Stochastic Peer-to-Peer Networks", In Journal of IEEE/ACM Transactions on Networking, vol. 16, No. 2, Apr. 2008, pp. 253-266.

* cited by examiner

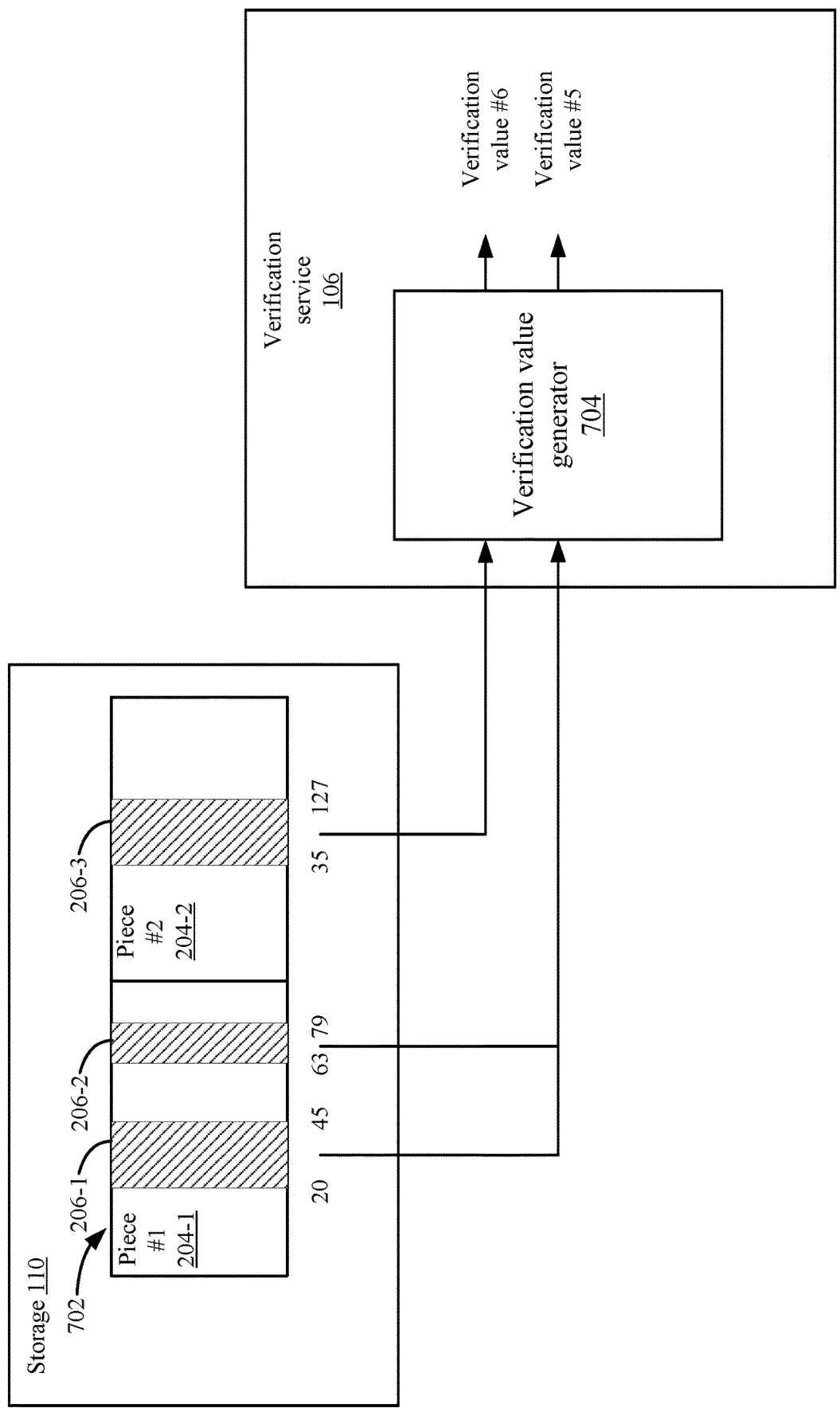

VERIFICATION OF DOWNLOADED SUBSETS OF CONTENT

BACKGROUND

In communication networks, such as peer-to-peer networks or client-server networks, content that is being distributed to client devices is partitioned (e.g., broken or chunked) into discrete pieces, which may usually be the same size. Each of these pieces (e.g., 1-megabyte pieces) are hashed to create a verification value (e.g., a secure hash algorithm 1 (SHA-1) value). The verification values may be stored in an authorization digest that includes all the verification values for the pieces of content.

Client devices download the pieces of the content, such as from other clients or from a source such as a content delivery network. The client device may download an entire file, such as a 500-megabyte file that includes 500 individual 1-megabyte pieces. The client device can generate a verification value for each piece and check the generated verification value against the digest to validate the integrity of the bytes downloaded for each piece. Downloading the whole file and checking the verification values for each individual piece requires a large amount of data to be downloaded and also hashed. When a communication network is congested, the extra bandwidth used to download the entire file may cause performance degradation in the communication network.

BRIEF DESCRIPTION OF THE DRAWINGS

FIG. 7C depicts an example where verification service inputs different combinations of ranges to generate multiple verification values according to some embodiments.

DETAILED DESCRIPTION

Figure 1:
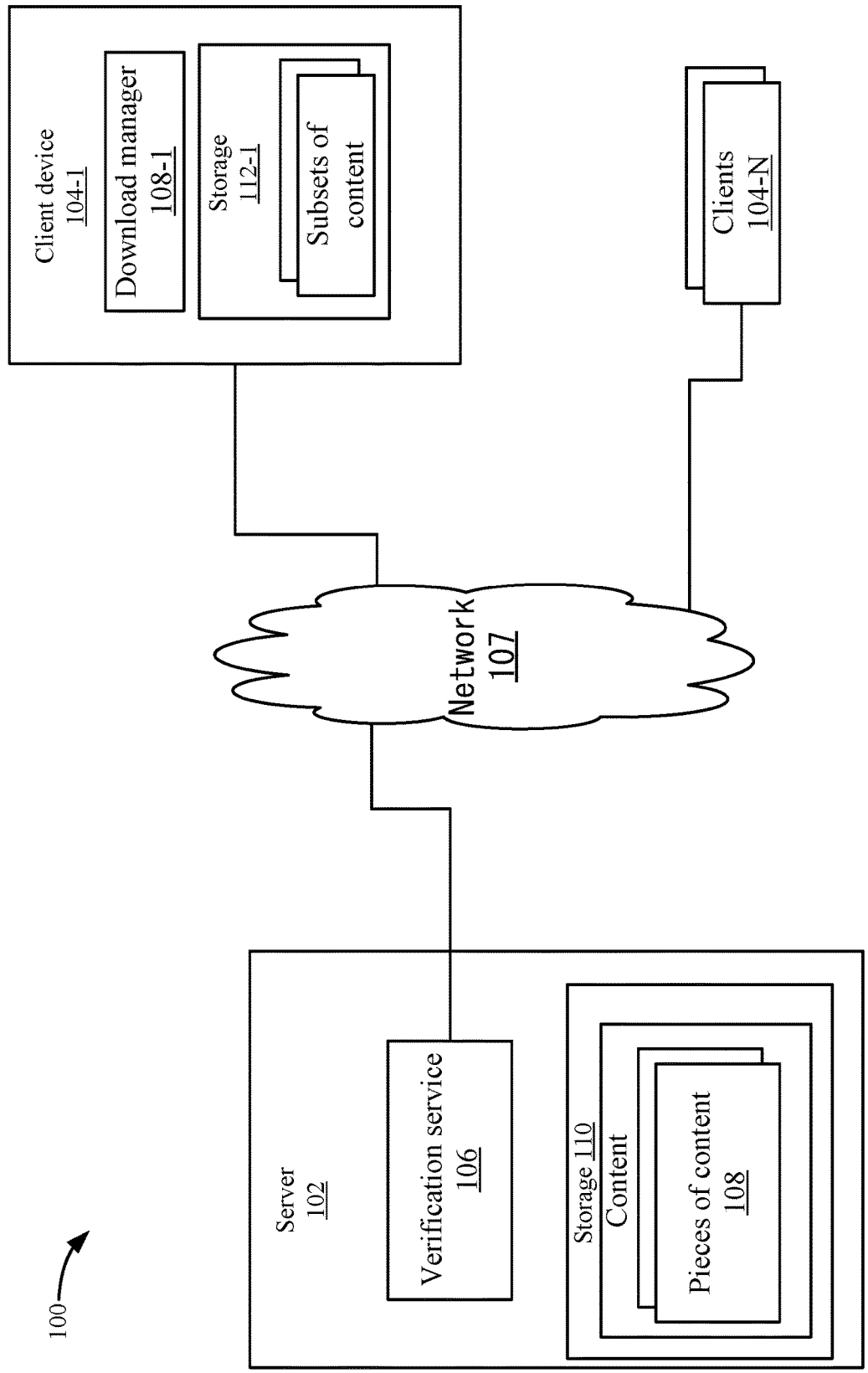
FIG. 1 depicts a simplified system for verifying content according to some embodiments.

In the following description, for purposes of explanation, numerous examples and details are set forth in order to provide an understanding of certain embodiments. It will be evident, however, to one skilled in the art that some embodiments can be practiced without some of these details, or can be practiced with modifications or equivalents thereof.

Some embodiments allow clients to download only the subsets of content that are needed by the clients from a content file. This reduces the amount of data that needs to be downloaded, which reduces the bandwidth used on the communication network and, in addition, uses less computing resources at the client device verifying the subsets of content. Conventionally, the content may be partitioned into pieces of content (e.g., chunks) as described above and client devices are required to download an entire piece to perform the validation because each piece is used to create a verification value in the authorization digest, which is a document that lists the verification values for the pieces. However, client devices may only need to download small non-consecutive ranges within the content. For example, a client device may require small ranges of consecutive bytes in pieces of content within the file. In some examples, the ranges may be included in different pieces of the file. For example, in a first piece, a 100-byte range of consecutive bytes may be needed from a one megabyte (MB) piece, and in a second one MB piece, a first 50-byte range of consecutive bytes and a second 50-byte range of consecutive bytes (the first range and the second range are non-consecutive) may be needed, and so on. If the client device needed to download the entirety of both of those pieces, the client device is downloading two MBs instead of the 200 bytes that are needed.

Since, in some embodiments, the client device does not download the entire piece of content, the authorization digest to validate each piece cannot be used by the client device because the authorization digest only includes verification values for the entire pieces of content. However, some embodiments provide a verification service that allows the client device to validate the subsets of content that were downloaded.

When subsets of content for a set of ranges is downloaded by a client device, the client device can send a description of the ranges to the verification service. For example, the description may describe which ranges have been downloaded, such as the range between the byte values of 100 to 200 within a piece of content. The client device may send the description for the combination of the multiple ranges that have been downloaded by the client device. Then, the verification service determines whether that combination of ranges has been received in combination in a prior request. For example, some client devices may be downloading the same ranges, which may occur when similarly configured client devices are downloading an update to the same software.

When the set of ranges has not been received in combination before, then the verification service uses the subsets of content represented by the ranges to generate one or more verification values that represent the subsets of content. In some embodiments, a hash function is used to generate a hash value, which is a numeric value that uniquely identifies a subset of content. Hash values represent subsets of content as much smaller numeric values than the content itself. In some embodiments, the verification service may generate a verification value for each range. In other embodiments, the verification service may input all of the subsets of content for the ranges to generate a single verification value for the combination. The content used to generate the verification value is the content maintained by the verification service, which has not been corrupted. One reason the client devices verify the content downloaded is to ensure the correct data was downloaded and is not corrupted. In some embodiments, when a peer-to-peer network is being used to download the content, there may be a higher probability of corruption occurring because multiple client devices download the content and provide portions of the content to other client devices, where it is more likely that data would become corrupt compared to if each client device separately downloading the content from a content server. Once the one or more verification values are computed, the verification service sends the one or more verification values to the client device.

When the set of ranges has already been received in combination in a previous request, the verification service retrieves one or more verification values that have been previously generated for the subsets of content for the ranges to the client device. In this case, the verification service does not need to generate the verification values for the subsets of content again, which saves time and computing resources. Accordingly, the description of the ranges that were downloaded can be used to save computing resources and time because the verification service can determine that subsets of content for the at least a portion of the ranges were used to generate verification values before.

Once receiving the verification values, the client device can verify the subsets of content that were downloaded by the client device. In this case, the subsets of content downloaded by the client device are input into a verification value generator to generate one or more verification values. The client device can generate verification values for each range or verification values for the combination of ranges depending on which verification values were generated by the verification service. If the verification values generated by the client device match the verification values received from the verification service, this verifies that the content downloaded by the client was not corrupted.

The above process may save bandwidth because the client device sends the description of the combination of ranges to the verification service. If a message was sent for each range that was downloaded, the multiple messages that are sent may use a lot of bandwidth. Also, another technique that may save bandwidth is the client device can use the description of the combination of ranges to generate a validation key (e.g., hash value of the description) instead of sending the description in a format such that the verification service can determine the description for the set of ranges from only the description. This format may be referred to as a "stand-alone format", and may be a text format, a human readable format, an encoded format, a compressed format, a zipped format, etc.

Overview

FIG. 1 depicts a simplified system 100 for verifying content according to some embodiments. System 100 includes a server 102 and client devices 104-1 to 104-N. The components of client device 104-1 may be included in each client device 104. Client devices 104 use a verification service 106 that verifies the content downloaded by a download manager 108 of client devices 104.

The content may be downloaded by client devices 104 via a communication network 107. For example, client devices 104 may download the content via peer-to-peer networking where client devices 104 download content from other client devices 104. In other embodiments, client devices 104 download content using a client-server model where each client device 104 downloads the content from a content server (not shown), which may store the content in a content file.

In some embodiments, the content may be partitioned into pieces of content, such as 500 one megabyte pieces of content. The content may be partitioned into pieces because peer to peer downloading of the content is possible where the pieces of content allow a client device 104 to download pieces from different client devices 104. However, the content does not need to be partitioned into pieces. For example, client devices 104 can just download subsets of content from ranges within the entire content file that is not broken into pieces. These ranges may include consecutive bytes within the ranges; however, each range is not consecutive. That is, a first range is from 50-100 bytes in the content file and the second range may be from 200-240 bytes in the content file. The first range and the second range are not consecutive because client device 104 does not download the 101-199 bytes of the content file. For discussion purposes, the content will be described as being partitioned into pieces of content, but partitioning the content into pieces is not necessary, rather only that non-consecutive ranges are downloaded may be needed.

Client devices 104 may store subsets of the content in storage 112. The subsets of the content may correspond to ranges within the pieces of the content. It is possible that client devices 104 may download the subsets of content in storage 112 from other entities, such as peer client devices in a peer-to-peer network or from a content server in a content delivery network. There may be a requirement that the subsets of content be verified before client devices 104 can use the content. Server 102 uses the content stored in storage 110 to verify the content downloaded by client devices 104. The content stored in storage 110 is a verified copy of the content.

Ranges

Figure 2:
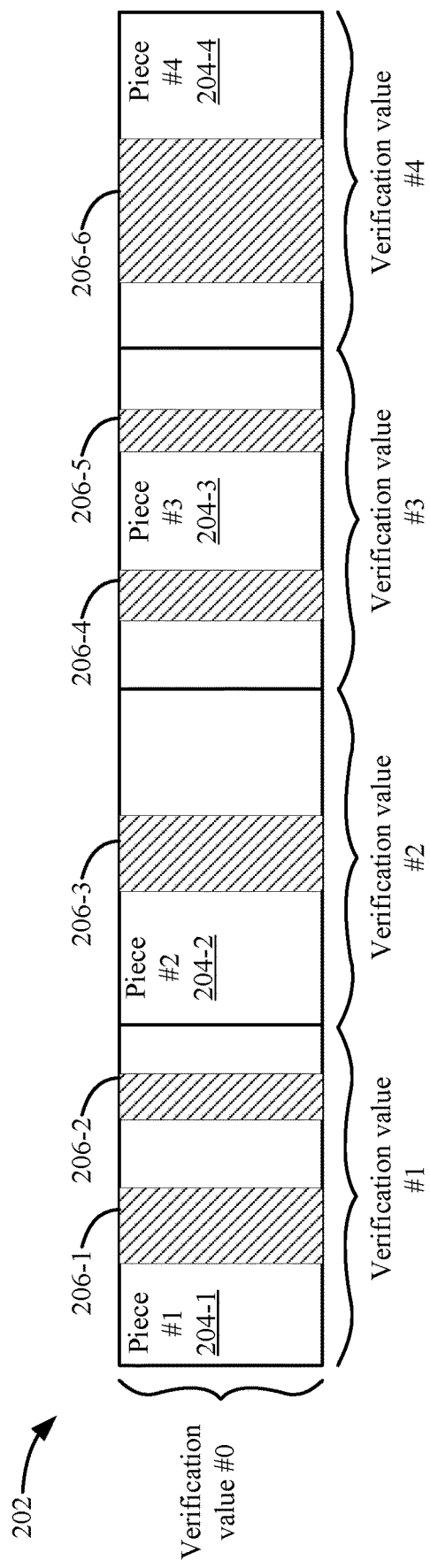
FIG. 2 depicts an example of the ranges that a client device may download according to some embodiments.

As discussed above, download manager 108 may download ranges of the pieces of content. FIG. 2 depicts an example of the ranges that client device 104 may download according to some embodiments. Content is shown at 202 that has been partitioned into pieces 204-1, 204-2, 204-3, and 204-4 (pieces #1-#4). As discussed above, the content may include any number of pieces or no pieces at all. Conventionally, each piece 204 may be hashed to generate verification values #1, #2, #3, and #4 for pieces of content 204-1, 204-2, 204-3, and 204-4, respectively. In the alternative, the entire content file 202 may be hashed to generate a verification value #0.

Instead of downloading each piece, client device 104 may only download ranges within each piece. For example, client device 104 has downloaded ranges 206-1 and 206-2 in piece of content 204-1, a range 206-3 in piece of content 204-2, ranges 206-4 and 206-5 in piece of content 204-3, and a range 206-6 in piece of content 204-4. The ranges describe where the subsets of content are located in the pieces. As used, a "range" may be the description of the range of bytes within the piece of content 204 that are downloaded, such as a byte value of 100 to a byte value of 200 within a piece of content 204. The "subsets of content" are the actual content between the byte value of 100 and the byte value of 200. In some embodiments, the subsets of content are used to generate the verification values, not the ranges.

Because the verification value is not for the entire piece of content 204, client devices 104 do not use the authorization digest to verify the subsets of content that were downloaded. Additionally, because client devices 104 may download small ranges that may vary immensely, verification service 106 cannot generate verification values for every single possible subset of content that may be downloaded by client device 104 and provide the verification values in the authorization digest. Accordingly, some embodiments provide verification of the ranges 206 that are downloaded by client device 104 in real-time.

Client Side Process

Figure 3:
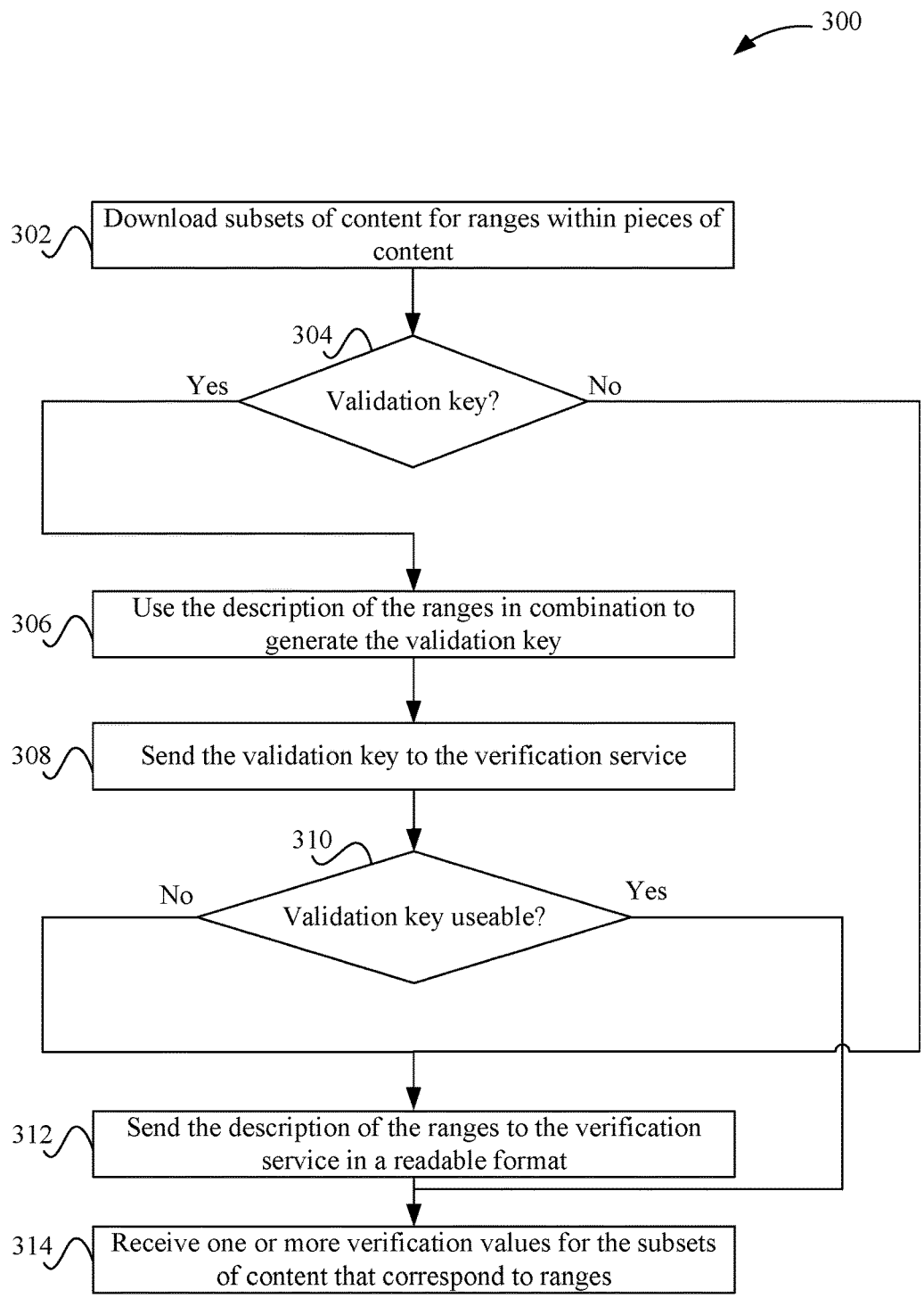
FIG. 3 depicts a simplified flowchart of a method for verifying subsets of content downloaded by the client device according to some embodiments.

FIG. 3 depicts a simplified flowchart 300 of a method for verifying subsets of content downloaded by client device 104 according to some embodiments. This method may be performed by every client device 104 that downloads subsets of content.

At 302, client device 104 downloads subsets of content for ranges 206 within pieces of content 204. The subsets of content correspond to ranges 206 that are non-consecutively located in pieces of content.

Figure 4:
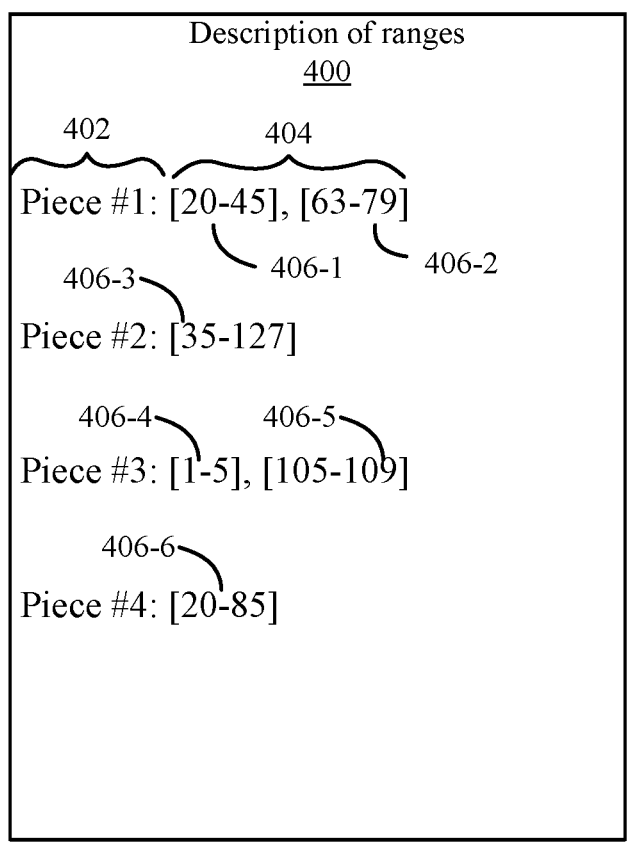
FIG. 4 depicts an example of a description of the ranges according to some embodiments.

Once the subsets of content are downloaded, client device 104 sends a description of the ranges that were downloaded to verification service 106. The description of ranges 206 may be metadata that describes ranges 206 that were downloaded. FIG. 4 depicts an example of a description 400 of ranges 206 according to some embodiments. For example, pieces are shown at 402 and ranges 206 within each piece are shown at 404. It is noted that different formats for the description of the ranges may be appreciated. For example, when the content is not partitioned into pieces, byte values are not reset at each piece and go from 0 to X, where X is the end of the content file.

In this example, each piece of content starts at the byte value of 1 and ends at a byte value of the size of the piece, such as 1 MB. For example, at 406-1, the description of the range is [20-45], which correspond to the subset of content from bytes 20-45 within piece #1 of content. Similarly, at 406-2, the description of the range is bytes 63-79 within piece #1 of content. Other descriptions of ranges are also shown at 406-3, 406-4, 406-5, and 406-6. Each range is a description for subsets of content that were downloaded for pieces #2, #3, and #4, respectively.

In some embodiments, client device 104 may send the description 400 in a standalone format to verification service 106, such as client device 104 provides the description for all of the ranges 206 in the text file. The standalone format is a format that verification service 106 can use to determine the description for ranges 206 without referencing other information. In other embodiments, client device 104 may use the description of the ranges 206 to generate a validation key, which may be a number that uniquely represents the combination of ranges 206. For example, the descriptions may be used to generate a hash value. The use of the validation key may save an amount of data that has to be communicated from client device 104 to server 102 because only one value is sent for the description of ranges instead of the entire description of the ranges. However, verification service 106 cannot determine the ranges 206 from just the validation key. Rather, verification service 106 would have had to store the description for ranges 206 for the validation key previously, such as when the same ranges 206 were processed in a prior request.

Referring back to FIG. 3, client 104 may or may not use the validation key. At 304, client device 104 determines whether or not to use a validation key of the combination of the ranges 206 in the description. In some embodiments, client device 104 may always attempt to use a validation key at first. In other embodiments, client device 104 may use a validation key if client device 104 detects that this combination of ranges 206 may be popular download with other clients. If the validation key is to be used, at 306, client device 104 uses the description of the combination of ranges 206 to generate the validation key. Then, at 308, client device 104 sends the validation key to verification service 106.

Verification service 106 cannot use only the validation key to determine the exact ranges 206 that were downloaded by client 104 as discussed above. Rather, verification service 106 checks storage 112 to determine whether or not the combination of ranges 206 for the validation key has been received before. In this case, verification service 106 may have used the combination of ranges 206 to generate a validation key previously and stored the combination of ranges 206 with the validation key. Thus, if verification service 106 can retrieve the validation key from storage 112, then, verification service 106 can determine the description of the ranges 206 because verification service 106 would have saved the ranges with the validation key. However, if verification service 106 cannot retrieve the validation key, then verification service 106 needs to receive the description of ranges 206 from client device 104 in the format such that the verification service can determine the description for the set of ranges from only the description.

Once verification service 106 determines whether or not the validation key can be used, verification service 106 sends a message to client 104 either requesting the description of ranges 206 or can send the verification values for the subsets of content for the combination of ranges 206. For example, at 310, client device 104 may receive a message from verification service 106 indicating that verification service 106 could use the validation key. If verification service 106 could not use the validation key, at 312, client device 104 sends the description of the ranges 206 to verification service 106 in the standalone format. the standalone format may use more bandwidth to transmit than the verification value. Also, referring back to 304, if client device 104 did not use the validation key, then the process skipped to this point where client device 104 sends the description of ranges 206 without sending the validation key.

If verification service 106 could use the validation key (and also after point 312 where client device sent the description of ranges 206 in the standalone format), at 314, client device 104 receives one or more verification values for the subsets of content that correspond to ranges 206. The verification values are received whether client device 104 sent the description of ranges 206 in standalone format to verification service 106 or if verification service 106 found the validation key.

In some embodiments, if client device 104 knows the description of the ranges 206 it will download before downloading all of ranges 206, client device 104 may send a description of ranges 206 prior to downloading of the subsets of content (or before client 104 finished the entire download of the subsets of content). Client device 104 may validate the subsets of content corresponding to ranges 206 as the client device 104 downloads the subsets of content. This may allow client device 104 to detect bad subsets of content in real-time instead of waiting for the entire subsets of content to be downloaded.

Server Side Process

Figure 5:
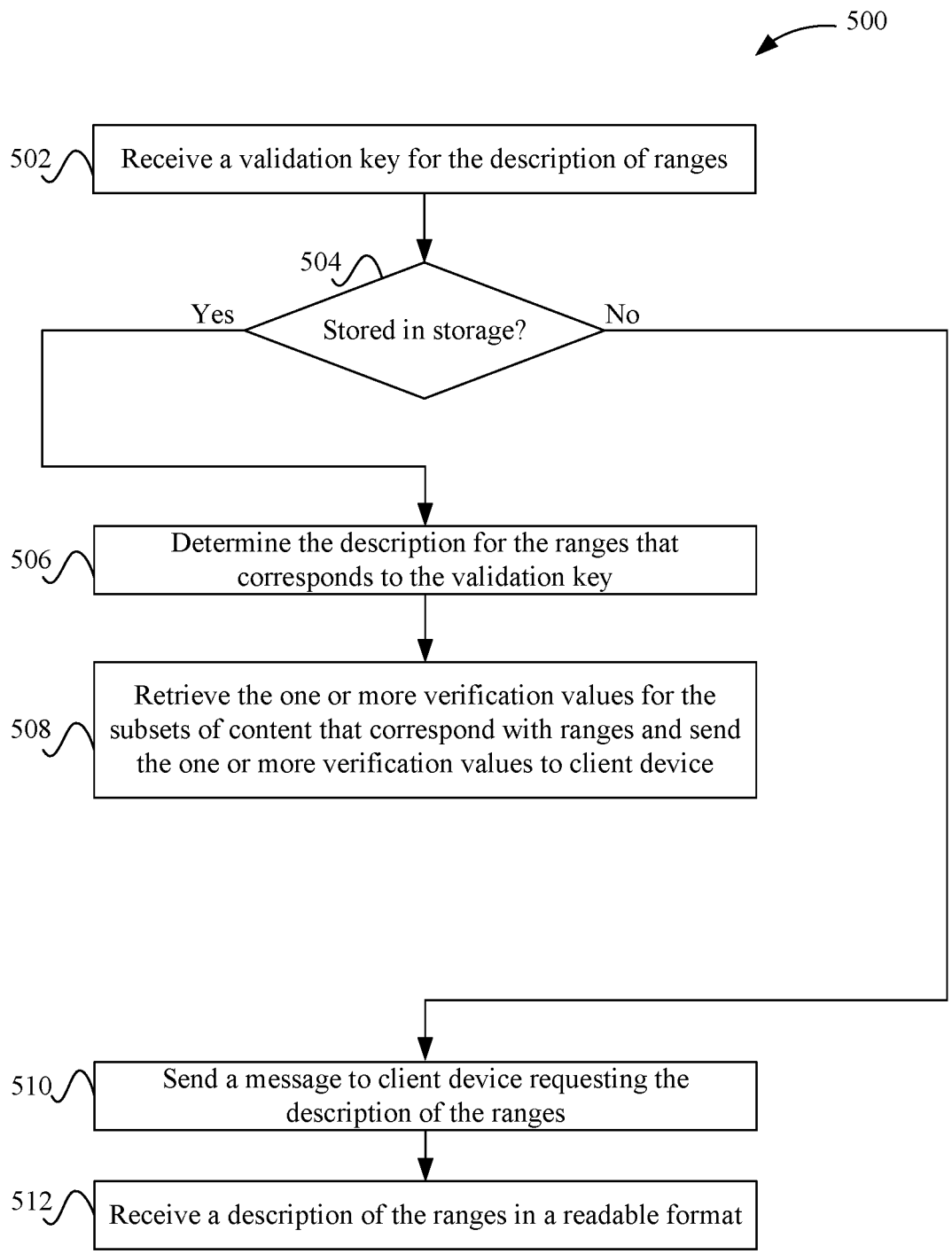
FIG. 5 depicts a simplified flowchart of a method for determining whether or not the validation key for ranges may be used according to some embodiments.
Figure 6:
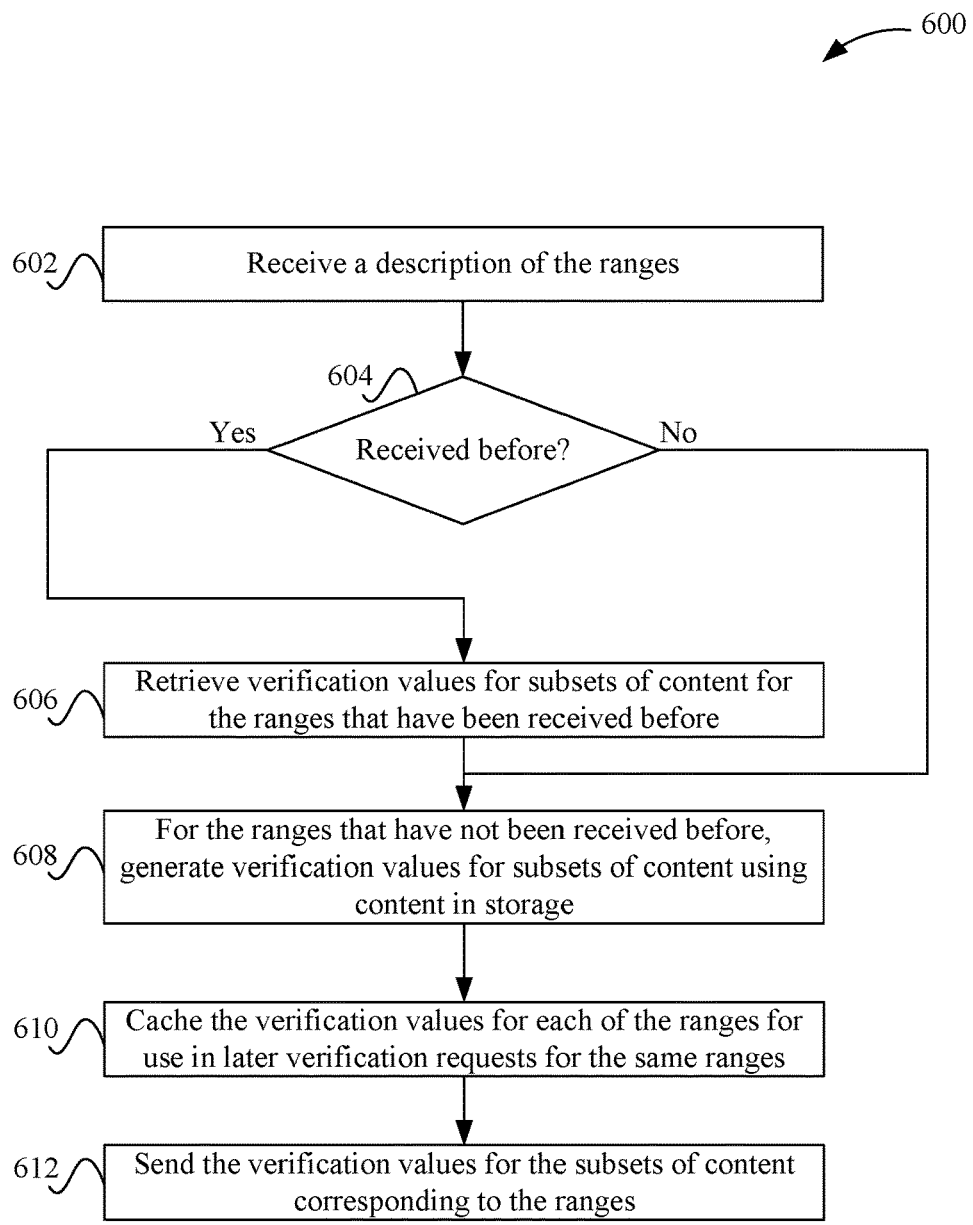
FIG. 6 depicts a simplified flowchart of a method for generating verification values for descriptions of subsets of content corresponding to the ranges of content received from client device at a server according to some embodiments.

The server side process first starts with receiving a validation key for the description of ranges 206, but in some embodiments, the validation key may not be received and the process of FIG. 6 can just be performed. FIG. 5 depicts a simplified flowchart 500 of a method for determining whether or not the validation key for ranges 206 may be used according to some embodiments. At 502, verification service 106 receives a validation key for the description of ranges 206. At 504, verification service 106 checks if the validation key is stored in storage 112. For example, if the description of the same exact ranges 206 has been received before, verification service 106 may have generated and stored the validation key in storage 112.

If the validation key for the description of the ranges 206 is stored in storage 112, at 506, verification service 106 determines the description for the ranges 206 that corresponds to the validation key. Then, at 508 verification service 106 retrieves the one or more verification values for the subsets of content that correspond with ranges 206 and sends the one or more verification values to client device 104.

If the validation key is not in storage 112, at 510, verification service 106 sends a message to client device 104 requesting the description of the ranges 206. At 512, verification service 105 receives a description of the ranges 206 in the standalone format. At this point, verification service 106 can then perform the process described in FIG. 6 to generate the one or more verification values for the subsets of content corresponding to the ranges 206.

FIG. 6 depicts a simplified flowchart 600 of a method for generating verification values for descriptions of subsets of content corresponding to ranges 206 received from client device 104 at server 102 according to some embodiments. At 602, verification service 106 receives a description of ranges 206. In this case, the description of ranges 206 may be a text file and not a validation key for the description of the ranges 206.

At 604, verification service 106 checks storage 112 to determine whether or not the same combination of ranges 206 for at least a portion of the same description has been received before. For example, all of the ranges 206 in the combination may have been received before the description of ranges 206 was received, such as from a time period starting from when the update was released to when the description of ranges 206 was received. In some embodiments, not all of ranges 206 in the combination may have been received, but it may be possible to save computing resources if some of the ranges were received. For example, 5 out of the 6 ranges 206 may have been received before and had verification values generated. The verification values for subsets of content for the five ranges may be retrieved.

At 606, if a portion of ranges 206 have been received before the description of ranges 206 was received, such as within the time period described above, verification service 106 retrieves verification values for subsets of content for the ranges 206 that have been received before. For example, 5 of the 6 verification values for subsets of content may be retrieved. As mentioned above, it is possible that some subsets have been combined into fewer verification values.

At 608, for the ranges 206 that have not been received before, verification service 106 generates verification values for subsets of content in storage 112 corresponding to the ranges 206 that have not been received before. At 610, verification service 106 may cache the verification values for each of the ranges 206 for use in later verification requests for the same ranges.

In some embodiments, verification service 106 generated verification values for each subset of content for each separate range 206. For six ranges, verification service 106 generates six verification values. In other embodiments, verification service 106 may generate a verification value for the entire combination of ranges 206. That is, subsets of content for multiple ranges 206 may be input into a verification value generator to generate a single verification value for the entire combination of ranges 206. The single verification value may then be used subsequently when the same combination of ranges 206 is received. For example, for six ranges 206, verification service 106 generates one verification value. This may be more efficient than generating multiple verification values and verifying each verification value at client device 104. However, if verification values for each individual range 206 are generated, then when a combination of ranges 206 is received, there is a higher probability the combination may include a single range that has been seen before rather than the whole combination. In other embodiments, some ranges may be combined, such as subsets of content for 5 out of 6 ranges are combined to generate a single verification value and then the subset of content for the sixth range is used to generate another verification value.

At 612, verification service 106 sends the verification values for the subsets of content corresponding to the ranges 206. Verification service 106 may send a single verification value for the combination of ranges 206, individual verification values for each range 206, or verification values for multiple ranges 206. That is, verification service 106 may have a verification value for three of the ranges 206 and a verification values for the other three ranges 206, a verification value for five of the ranges 206 in combination, and a verification value for the sixth range 206. By sending the verification value for a combination of ranges 206, bandwidth is conserved because less data is sent.

Figure 7A:
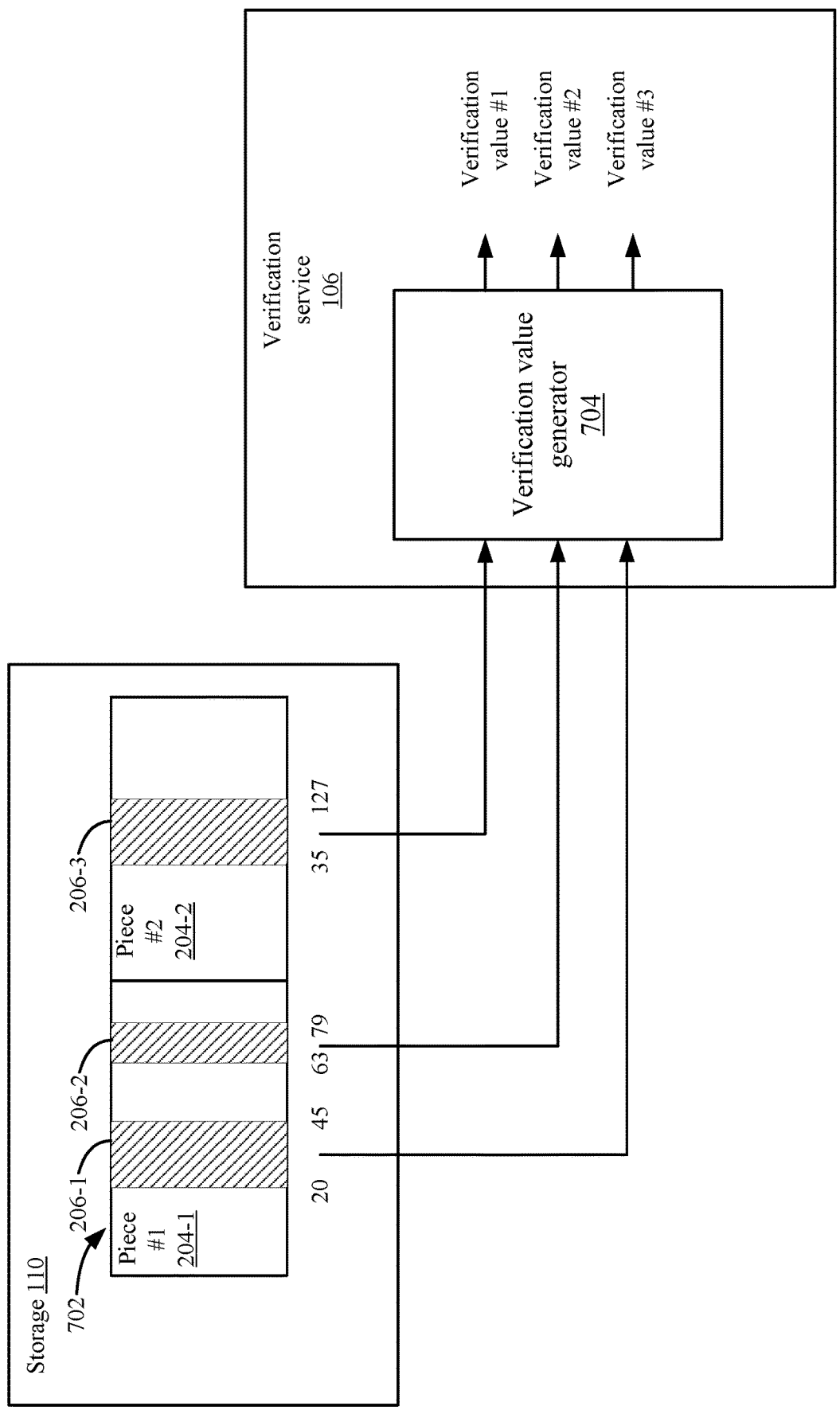
FIG. 7A depicts an example for generating a verification value for each range according to some embodiments.
Figure 7B:
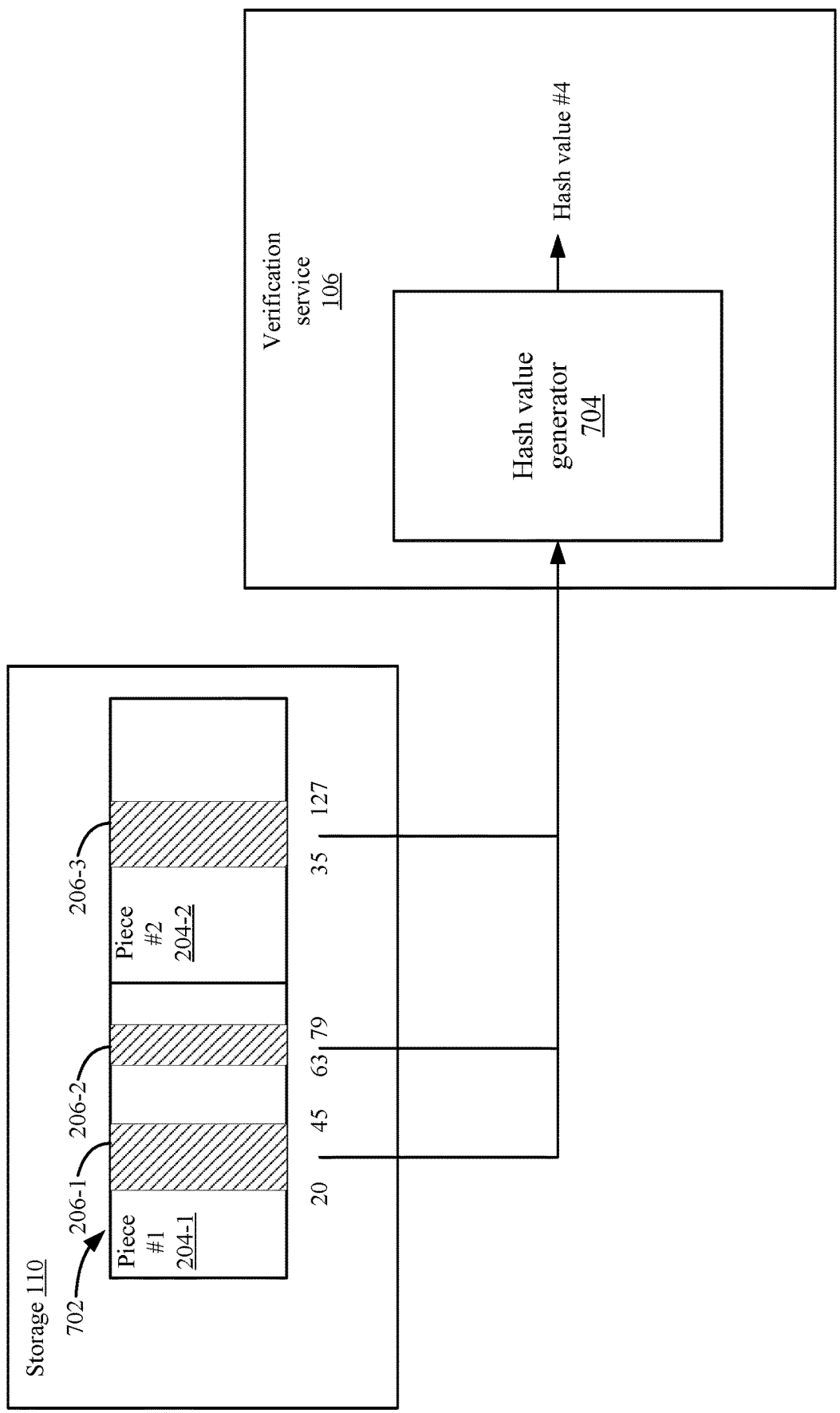
FIG. 7B depicts an example where a verification service inputs the combination of ranges to generate a single verification value according to some embodiments.

FIGS. 7A, 7B, and 7C depict different systems of generating verification values at verification service 106 according to some embodiments. FIG. 7A depicts an example for generating a verification value for each range 206 according to some embodiments. At 702, three ranges 206-1, 206-2, and 206-3 are shown. For example, the ranges 206 may be from bytes 20-45 and bytes 63-79 in a piece #1, and from bytes 35-127 in a piece #2. Verification service 106 may take subsets of content corresponding to each individual range 206 and input the subsets of content separately into a verification value generator 704. Verification value generator 704 may use an algorithm that generates verification values from input data. The algorithm, such as a SHA-1 algorithm, SHA-256 algorithm, SHA-384 algorithm, SHA-512 algorithm, and message digest 5 (MD5) algorithm, may be a hash function that generates hash values that uniquely represent the input data. Verification value generator 704 and clients 104 use the same algorithm to generate verification values.

In this example, a subset of content corresponding to bytes 20-45 of piece #1 is input into verification value generator 704 to generate a verification value #1. Then, verification service 106 inputs a second subset of content corresponding to bytes 63-79 of piece #1 to generate verification value #2. Similarly, verification service 106 inputs a third subset of content corresponding to bytes 35-127 of piece #2 into verification value generator 704 to generate verification value #3. Accordingly, multiple verification values are generated. These individual verification values can be stored for later use when the same range is received in a request from other client devices 104.

FIG. 7B depicts an example where verification service 106 inputs the combination of ranges 206 to generate a single verification value according to some embodiments. Verification service 106 inputs the subsets of content from bytes 20-45 of piece #1, bytes 63-79 of piece #1, and bytes 35-127 of piece #2 sequentially into verification value generator 704. Verification value generator 704 generates a verification value #4 for the combination of the subsets of content. Accordingly, a single verification value can be used to verify the ranges of content in the combination of subsets of content for the combination of ranges 206.

Also, it will be recognized that different combinations of subsets of content for ranges 206 may be used, such as 2 out of 3 ranges are used to generate a single verification value and the $3^{rd}$ range is used to generate a second verification value. FIG. 7C depicts an example where verification service 106 inputs different combinations of ranges 206 to generate multiple verification values according to some embodiments. Different combinations are possible, but in this example, verification service 106 inputs the subsets of content from each piece into verification value generator 704. For example, the subsets of content from bytes 20-45 of piece #1 and bytes 63-79 of piece #1 are input into verification value generator 704 to generate a verification value #5. Also, the subsets of content from bytes 35-127 of piece #2 are input into verification value generator 704 to generate verification value #6.

Figure 8:
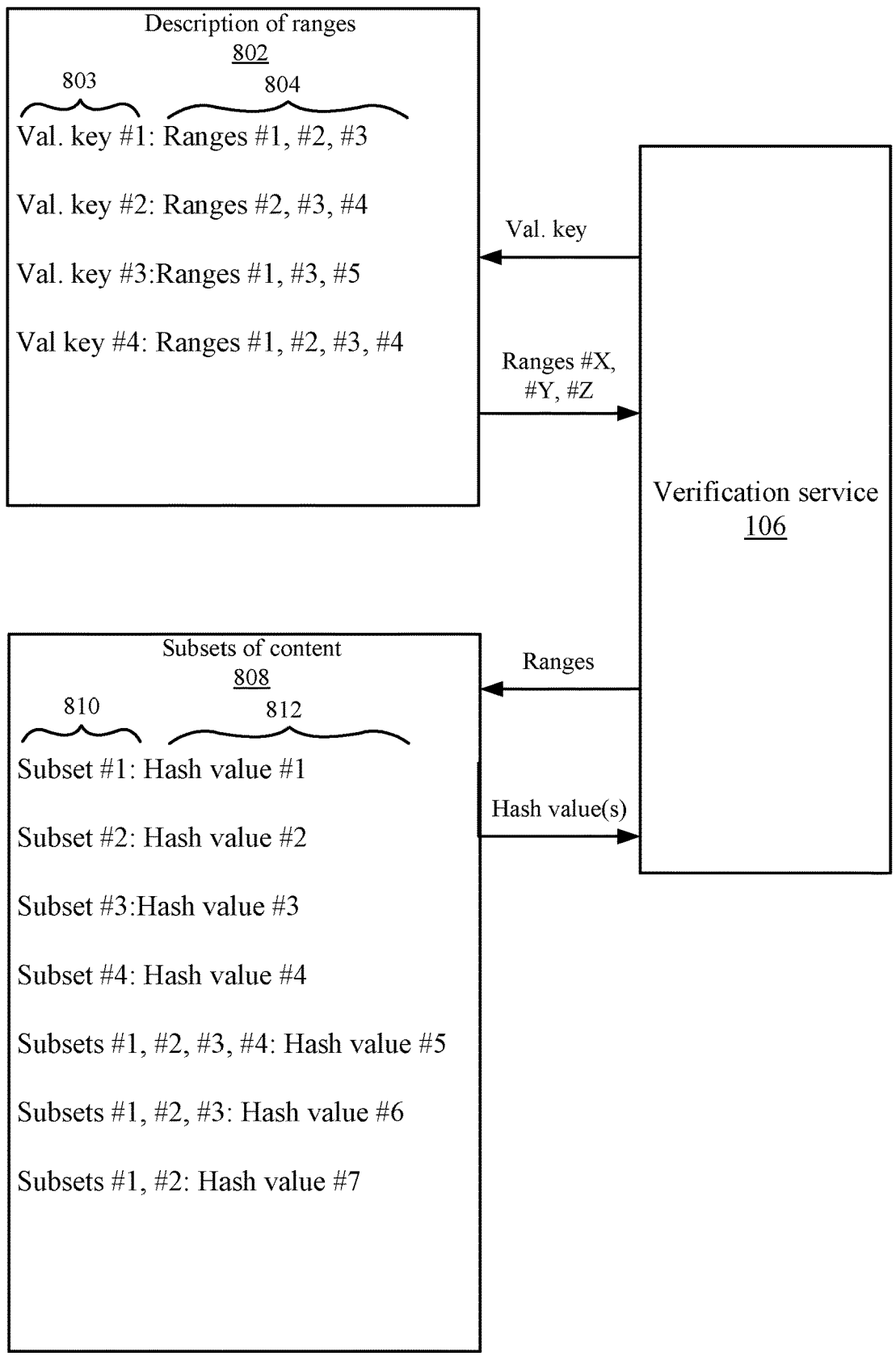
FIG. 8 depicts an example of accessing cached verification values according to some embodiments.

As mentioned above, verification service 106 may also access cached validation keys or cached verification values in storage 112 to increase the efficiency of the service. FIG. 8 depicts an example of accessing cached verification values according to some embodiments. For example, a first section 802 of storage 112 may store validation keys (Val. key) at 803 for ranges 206. Section 802 is used by verification service 106 to determine whether or not the validation key could be used. The validation key may be a hash of the description of ranges 206, such as the description for the ranges of bytes 20-45 and bytes 63-79 of piece #1 and the range of bytes 35-127 of piece #2. This combination may create a validation key #1. For discussion purposes, ranges of byte values have been simplified to ranges #1, #2, #3, #4, and #5. These ranges may refer to bytes, such as range #1 is the description of bytes 20-45 of piece #1, range #2 is the description of bytes 63-79 of piece #1 and so. Different descriptions of ranges may be used to generate validation keys, such as ranges #2, #3, and #4 are used to generate a validation key #2, ranges #1, #3, and #5 are used to generate a validation key #3, and ranges #1, #2, #3, and #4 are used to generate a validation key #4.

Verification service 106 may reference section 802 to determine whether or not a description of the same combination of ranges 206 has previously been received. Each validation key may correspond to a description at 804 that specifies the ranges 206 for the validation key in the stand-alone format. Verification service 106 may use a query with the validation key to retrieve the description of ranges 206 for the validation key.

In second section 808 of storage 112, the subsets of content may be identified at 810 and verification values for the subsets of content are shown at 812. Verification service 106 uses second section 808 to determine whether subsets of content have already been used to generate verification values once the description is determined. In contrast, verification service 106 used first section 802 to determine the description of ranges 206, not the verification values. Each individual subset of content may be individually hashed and have a corresponding verification value stored in storage 112 at 812. For example, subsets of content #1, #2, #3, and #4 correspond to verification values #1, #2, #3, and #4, respectively. Additionally, combinations of subsets of content may have corresponding verification values. For example, the combination of subsets of content #1, #2, #3, and #4 has a corresponding verification value of #5. Additional smaller combinations may also be stored of subsets of content #1, #2, #3, and subsets of content #1 and #2, which correspond to verification values #6 and #7, respectively. Verification service 106 may use a query with the ranges to retrieve the verification values based on the ranges provided for the subsets of content.

Verification at the Client Device

Figure 9:
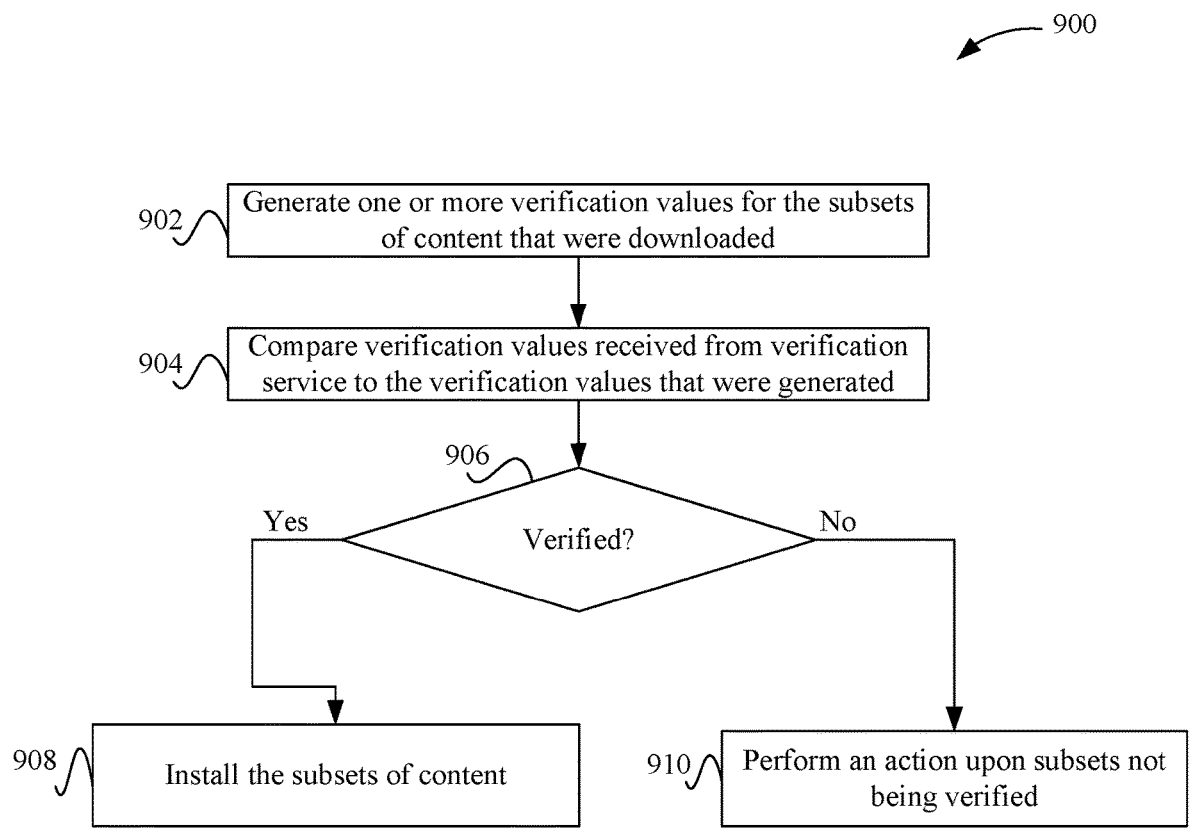
FIG. 9 depicts a simplified flowchart for verifying the verification values at a client device according to some embodiments.

Once receiving the verification values, client device 104 can verify the downloaded content. FIG. 9 depicts a simplified flowchart 900 for verifying the verification values at client device 104 according to some embodiments. At 902, client device 104 generates one or more verification values for the subsets of content that were downloaded. Client device 104 uses the same verification value generation algorithm as that used by verification service 106. For example, a verification value for each range 206 may be generated or a single verification value for the combination of ranges 206 may be generated. In some embodiments, client device 104 may use metadata received from verification service 106 indicating what combinations of subsets of content the verification values cover. At 904, client device 104 then compares verification values received from verification service 106 to the verification values that were generated. At 906, client device 104 determines if subsets of content were verified. At 908, if the subsets of content were verified, client device 104 can install the subsets of content. In some embodiments, client device 104 select small byte ranges for a download, such as an update to a binary (e.g., an operating system update, application store update, game console update) or other software, or binary or other software download. Client device 104 selects the byte ranges that are needed for an applicable computer state, such as a video card driver, hard drive driver, operation system update, or operating system version update. Client device 104 can install the byte ranges, such as the binaries, that are downloaded. In some examples, individual byte ranges may be associated with different aspects of an update and are installed to update aspects of client device 104. When installing the byte ranges, the updates may be stored in storage at client device 104. At 910, if the subsets of content were not verified, client device 104 may perform an action, such as re-downloading the subsets of content or downloading the entire piece of content.

Accordingly, some embodiments allow client devices 104 to only download subsets of content and verify the subsets of content. The verification method may reduce the messaging between client device 104 and verification service 106. For example, the validation key of the combination of ranges 206 may be used to determine the description of the ranges that has been downloaded. Also, the communication of the combination of ranges 206 reduces the number of messages when compared to verifying each subset of content with an individual message.

System Overview

Figure 10:
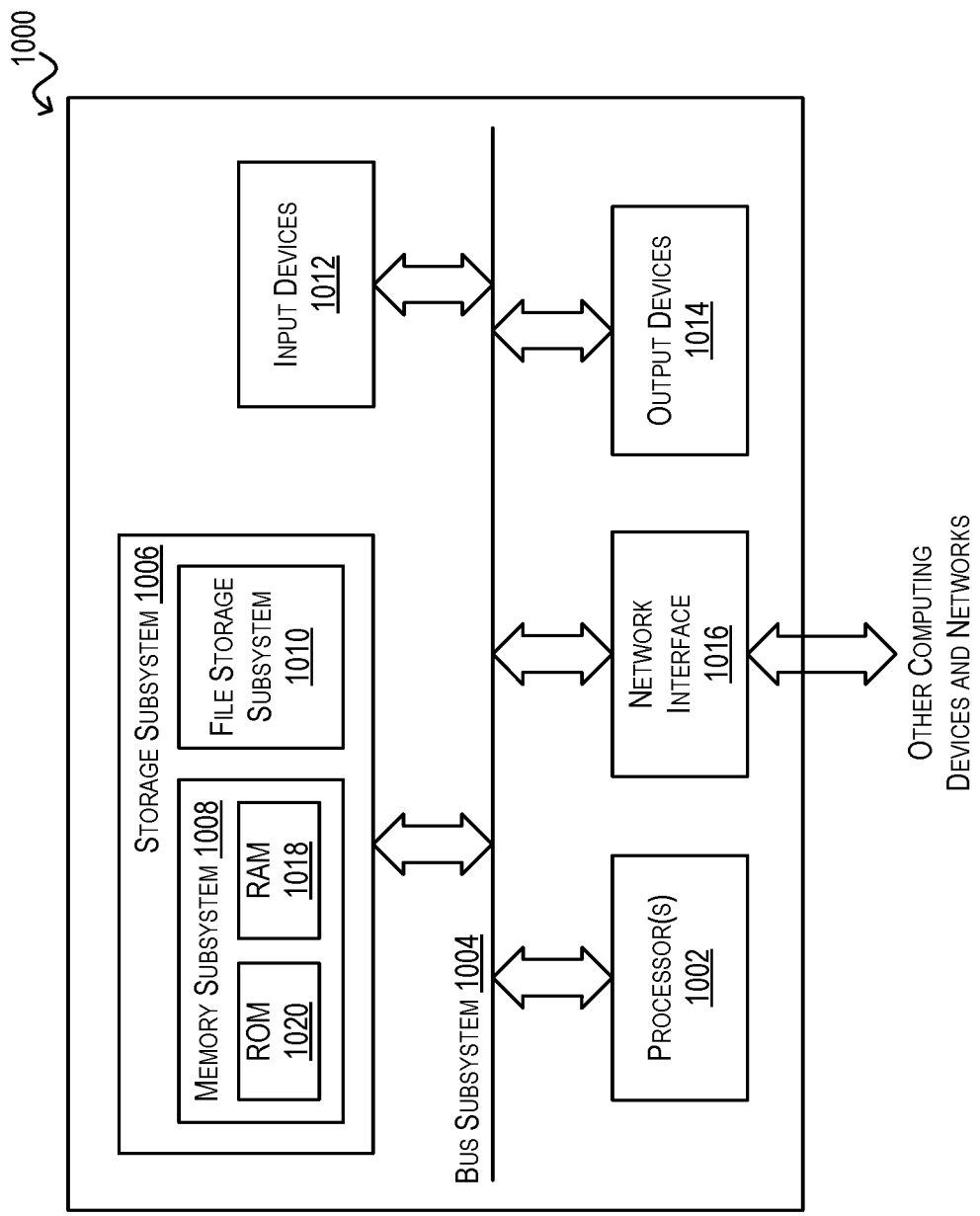
FIG. 10 is a simplified block diagram of a computer system according to some embodiments.

FIG. 10 is a simplified block diagram of a computer system 1000 according to an embodiment. In some embodiments, computer system 1000 can be used to implement verification. As shown in FIG. 10, computer system 1000 includes one or more processors 1002 that communicate with a number of peripheral devices via a bus subsystem 1004. These peripheral devices include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, some embodiments of the bus subsystem can utilize multiple busses.

Network interface subsystem 1016 can serve as an interface for communicating data between computer system 1000 and other computer systems or networks. Some embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be a flat-panel device such as a liquid crystal display (LCD), or a projection device. In general, use of the term "output device" is intended to include all possible types of devices and mechanisms for outputting information from computer system 1000.

Storage subsystem 1006 includes a memory subsystem 1008 and a file/disk storage subsystem 1010. Subsystems 1008 and 1010 represent non-transitory computer-readable storage media that can store program code and/or data that provide the functionality of some embodiments.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments. Many other configurations having more or fewer components than system 1000 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   one or more computer processors; and
   a non-transitory computer-readable storage medium comprising instructions, that when executed, cause the one or more computer processors to:
   receive, at a verification service, a description for a combination of a set of ranges within content available for download, wherein the set of ranges are not sequentially located in the content that a client device has downloaded;
   determine if at least a first portion of the combination of the set of ranges has been received in a prior request that included a description for the at least first portion of the combination of the set of ranges;
   when at least the first portion of the combination of the set of ranges has been received in the prior request, retrieve a first set of verification values that represent subsets of content corresponding to the first portion of the combination of the set of ranges, the first set of verification values being generated for the prior request;
   when at least a second portion of the combination of the set of ranges has not been received in the prior request, generate a second set of verification values using subsets of content corresponding to the second portion of the combination of the set of ranges; and
   send the one or more of the first set of verification values and the second set of verification values to the client device to allow the client device to verify subsets of content downloaded by the client that correspond to the set of ranges.

2. The computer system of claim 1, wherein receiving the description for the combination of the set of ranges comprises:
   receive a validation key that uniquely represents the description for the set of ranges.

3. The computer system of claim 2, wherein determining if the combination of the set of ranges has been received in the prior request comprises:
   determine if the validation key is stored by the verification service;
   if the validation key is stored, retrieve the description for the first portion of the combination of the set of ranges; and
   retrieve the first set of verification values for the subsets of content corresponding to the description.

4. The computer system of claim 3, wherein the validation key was stored for the prior request that requested a same combination of the first portion of the combination of the set of ranges.

5. The computer system of claim 1, wherein receiving the description for the combination of the set of ranges comprises:
   receive the description of the ranges in a format such that the verification service determines the description for the set of ranges from only the description.

6. The computer system of claim 1, wherein determining if the combination of the set of ranges has been received in the prior request comprises:

determine if the first set of verification values are stored for the first portion of the combination of the set of ranges; and retrieve the first set of verification values without generating the first set of verification values.

7. The computer system of claim 6, wherein the first set of verification values were stored for the prior request that requested a same combination of the set of ranges.

8. The computer system of claim 1, determining if the first portion of the combination of the set of ranges has been received in the prior request comprises:

determine the first portion of the combination of the set of ranges has been received in the prior request; and determine the second portion of the combination of the set of ranges has not been received in the prior request.

9. The computer system of claim 1, wherein generating the second set of verification values comprises:

generate a verification value for each subset of content corresponding to the second portion of the combination of the set of ranges as the second set of verification values.

10. The computer system of claim 1, wherein generating the second set of verification values comprises:

generate a single verification value using all subsets of content corresponding to the second portion of the combination of the set of ranges as the second set of verification values.

11. The computer system of claim 1, wherein generating the second set of verification values comprises:

generate at least one verification value for multiple subsets of content corresponding to the second portion of the combination of the set of ranges as one of the second set of verification values.

12. The computer system of claim 1, further comprising:

store the second set of verification values for each of the second portion of the combination of the set of ranges separately in the storage for use in processing subsequent requests for ranges within pieces of the content.

13. The computer system of claim 12, further comprising:

generate a validation key from the description for the combination of the set of ranges; and store the validation key with one or more of the first set of verification values and the second set of verification values in the storage for use in processing subsequent requests that include the combination of the set of ranges.

14. The computer system of claim 1, wherein:

the first portion of the combination of the set of ranges includes the entire combination of the set of ranges and the first set of verification values represent subsets of content corresponding to the combination of the set of ranges, or the second portion of the combination of the set of ranges includes the entire combination of the set of ranges and the second set of verification values represent subsets of content corresponding to the combination of the set of ranges.

15. The computer system of claim 1, wherein the content is partitioned into a plurality of pieces of content and the set of ranges correspond to subsets of content in the pieces of content.

16. A method comprising:

receiving, at a verification service of a computing device, a description for a combination of a set of ranges within content available for download, wherein the set of ranges are not sequentially located in the content that a client device has downloaded;

determining, by the computing device, if at least a first portion of the combination of the set of ranges has been received in a prior request that included a description for the at least first portion of the combination of the set of ranges;

when at least the first portion of the combination of the set of ranges has been received in the prior request, retrieving, by the computing device, a first set of verification values that represent subsets of content corresponding to the first portion of the combination of the set of ranges, the first set of verification values being generated for the prior request;

when at least a second portion of the combination of the set of ranges has not been received in the prior request, generating, by the computing device, a second set of verification values using subsets of content corresponding to the second portion of the combination of the set of ranges; and sending, by the computing device, the one or more of the first set of verification values and the second set of verification values to the client device to allow the client device to verify subsets of content downloaded by the client that correspond to the set of ranges.

17. A computer system comprising:

one or more computer processors; and a non-transitory computer-readable storage medium comprising instructions, that when executed, cause the one or more computer processors to:

downloading subsets of content that are non-consecutively located in the content;

generating a description for a set of ranges corresponding to the subsets of the content;

generating a validation key using the description of the set of ranges, wherein the validation key represents the description;

sending the validation key to a verification service;

when the verification service has received the validation key in a prior request that included a description for the subsets of content that are non-consecutively located in the content, receiving one or more verification values for the subsets of content, the one or more verification values being generated for the prior request;

when the verification service has not received the validation key in the prior request, performing:

receiving a request for the description for the set of ranges;

sending the description of the set of ranges to the verification service; and receiving the one or more verification values for the subsets of content; and verifying the subsets of content that was downloaded using the one or more verification values.

18. The computer system of claim 17, wherein the one or more verification values each correspond to an individual subset of content.

19. The computer system of claim 17, wherein when the verification service has received the validation key in the prior request, the verification service received a same combination of the set of ranges in the prior request.

20. The computer system of claim 17, wherein the validation key uniquely represents a combination of the description of the set of ranges.

* * * * *